(12) United States Patent
Chidlovskii (10) Patent No.: US 9,116,894 B2
(45) Date of Patent: Aug. 25, 2015

(54) METHOD AND SYSTEM FOR TAGGING OBJECTS COMPRISING TAG RECOMMENDATION BASED ON QUERY-BASED RANKING AND ANNOTATION RELATIONSHIPS BETWEEN OBJECTS AND TAGS

(71) Applicant: Xerox Corporation, Norwalk, CT (US)

(72) Inventor: Boris Chidlovskii, Meylan (FR)

(73) Assignee: Xerox Corporation, Norwalk, CT (US)

( * ) Notice: Subject to any disclaimer, the term of this patent is extended or adjusted under 35 U.S.C. 154(b) by 119 days.

(21) Appl. No.: 13/828,048

(22) Filed: Mar. 14, 2013

(65) Prior Publication Data

US 2014/0280232 A1    Sep. 18, 2014

(51) Int. Cl.
*G06F 17/30*    (2006.01)

(52) U.S. Cl.
CPC ............................... *G06F 17/30038* (2013.01)

(58) Field of Classification Search
CPC .......... G06F 17/30038; G06F 17/3069; G06K 2209/27; G06K 9/6218
USPC .......... 707/737, 769, 802, 749; 382/159, 190, 382/224; 715/230
See application file for complete search history.

(56) References Cited

U.S. PATENT DOCUMENTS

| | | | |
|---|---|---|---|
| 7,213,032 B2 | 5/2007 | Mascarenhas | |
| 7,685,198 B2 | 3/2010 | Xu et al. | |
| 8,145,677 B2 * | 3/2012 | Al-Shameri | 707/802 |
| 8,260,859 B2 | 9/2012 | Boyer et al. | |
| 8,386,490 B2 * | 2/2013 | Jiang et al. | 707/739 |
| 8,396,286 B1 * | 3/2013 | Aradhye et al. | 382/159 |
| 8,671,069 B2 * | 3/2014 | Chang et al. | 706/52 |
| 8,856,051 B1 * | 10/2014 | Song et al. | 706/12 |
| 2008/0201632 A1 | 8/2008 | Hong et al. | |
| 2009/0094231 A1 * | 4/2009 | Marvit et al. | 707/5 |
| 2010/0223276 A1 * | 9/2010 | Al-Shameri et al. | 707/769 |
| 2010/0228691 A1 * | 9/2010 | Yang et al. | 706/12 |
| 2010/0250190 A1 * | 9/2010 | Zhang et al. | 702/181 |
| 2010/0332478 A1 | 12/2010 | Duman et al. | |
| 2011/0176737 A1 * | 7/2011 | Mass et al. | 382/220 |
| 2011/0188742 A1 * | 8/2011 | Yu et al. | 382/159 |
| 2011/0314367 A1 * | 12/2011 | Chang et al. | 715/230 |
| 2013/0268513 A1 * | 10/2013 | Wu et al. | 707/722 |
| 2014/0172419 A1 * | 6/2014 | John et al. | 704/201 |
| 2014/0280232 A1 * | 9/2014 | Chidlovskii | 707/749 |

FOREIGN PATENT DOCUMENTS

EP    1 962 202 A2    8/2008

OTHER PUBLICATIONS

Guan et al. "Personalized Tag Recommendation Using Graph-based Ranking on Multi-type Interrelated Objects"; Proceedings of the 32nd international ACM, 2009.*

* cited by examiner

*Primary Examiner* — Dennis Truong
(74) *Attorney, Agent, or Firm* — Fay Sharpe LLP (57) ABSTRACT

A method and system is disclosed for tagging a latent object with selected tag recommendations, including a set of content objects wherein each object is characterized by an associated set of content features. An annotation relationship is determined between the features and a pre-determined tag for the each object, the relationship being defined by a graph construction representative of an affinity relationship between each pre-selected tag and content object to a selected query. A plurality of the annotation relationships are ranked based upon a relevance of the preselected tags to the content features in response to a new query for assigning a new tag to the each object, so that a suggested tag is made from the ranking whereby the suggested tag is determined as a most likely tag for annotating the content object.

20 Claims, 4 Drawing Sheets

METHOD AND SYSTEM FOR TAGGING OBJECTS COMPRISING TAG RECOMMENDATION BASED ON QUERY-BASED RANKING AND ANNOTATION RELATIONSHIPS BETWEEN OBJECTS AND TAGS

TECHNICAL FIELD

The subject embodiments relate generally to methods and systems for annotating content objects, like images, documents or multimedia. More particularly, the subject embodiments relate to recommending an annotating tag by suggesting relevant tags to the objects or directly expanding the set of tags associated therewith.

BACKGROUND

Social media sharing sites like Flickr®, Delicious or YouTube® allow millions of users to share and annotate images, documents and videos. Tagging refers to the behavior of annotating content (images, documents, web pages, etc.) with tags which are often free text keywords. In recent years, social tagging is becoming more and more popular in Web 2.0 applications where users can freely annotate Web pages, academic publications and multimedia objects. Tag recommendation is concerned with suggesting relevant tags to the users, which they could potentially use to annotate the resources they visited. Tag recommendation is beneficial for users because it can improve the user experience in their tagging process, and for the system because it expands the set of tags annotating a content object thus enriching the system.

The wealth of annotated and tagged objects on the social media sharing sites can form a solid base for reliable tag recommendation. A tag recommendation engine can benefit from collective social knowledge to provide relevant suggestions.

Problems occur when many and diverse users are subjectively social tagging documents solely based upon personal standards or interests so that the tags appear in a free-form reflecting an individual users' choice.

A simple strategy of tag recommending would seem to exploit the popular tags that are frequently used by other users to annotate an image, while the recommended tags are the intersection of this user's tag vocabulary and all the tags annotated. Such a strategy exploits collaborative knowledge and does not require the content of documents. Unfortunately, such a strategy works poorly in practice. For example, the popularity distribution of tags in a social tagging system like Flickr follows the power law, with about 50% of tags used only once and a large majority of images are only tagged by one or two users. There is a need to explore the interrelation of the objects as well as the tags annotating them. On the other hand, different users may have very different preferences on the tags they would select to tag an image. Therefore, it is also desirable to develop personalized recommendation engine for social tagging.

There is a need for a system which can result in more accurate tagging, and thus improve the user tagging experience.

There is a need for a methods and systems to explore the interrelation of the content objects as well as the tag annotating them that may recognize that different users may have very different preferences on the tags that they would select to tag a content object. Thus, the desirable system will be able to develop personalized selected recommendation for social tagging per user.

SUMMARY

The subject embodiments relate to tag recommendation methods and systems which can assist users in a tagging process by suggesting relevant tags or directly expanding the set of tags associated with a content object. The method is based on a query-based ranking on relational multi-type graphs which capture the annotation relationship between objects and tags, as well as the object similarity and tag correlation. Embodiment features comprise combining the neighborhood linearization with a Laplacian regularization framework.

A method is provided for tagging a latent object with selected tag recommendations. For a set of content objects where each object is characterized by an associated set of content features, an annotation relationship is determined between the features and a predetermined tag for each object. The relationship is defined by a graph construction representative of an affinity relationship between each preselected tag and content object relative to a selected query. A plurality of annotation relationships are ranked based upon a relevance of the preselected tags to the content features in response to a second query for assigning a new tag to the content object. A suggested tag is suggested from the ranking whereby the suggested tag is determined as the most likely tag for annotating the content object.

In accordance with more particular features of the embodiments, the determining the annotation relationship comprises constructing a sparse affinity graph representative of the affinity relationship. The ranking comprises computing ranking vectors, content objects and predetermined tags, respectively in accordance with an iterative evaluation for identifying a converging correlation between the content object and the predetermined tags in response to the tagging query.

DETAILED DESCRIPTION

The disclosed embodiments comprise method and systems for tag recommendation for content objects, like images, documents or multimedia. Without limitation thereto, the embodiments are illustrated in the context of a number of scenarios wherein a method of tag recommendation is illustrated of a user in a tagging process of suggesting relevant tags or directly expanding the set of associated tags to a content object. The method is based on a query-based ranking from relational multi-type graphs which capture the annotation relationship between objects and tags, as well as the image similarity and tag correlation.

Any content object is described by a set of features that characterize its content. An image content is described by visual features, documents are represented by its textual content, etc. These two types of entities, content objects and tags, represent an example of a relational data setting. In this setting, entities of the same type form a uni-type relation like similarity graphs, and entities of different types form a multi-type relation which is represented by a bi-partitive graph.

Figure 4:
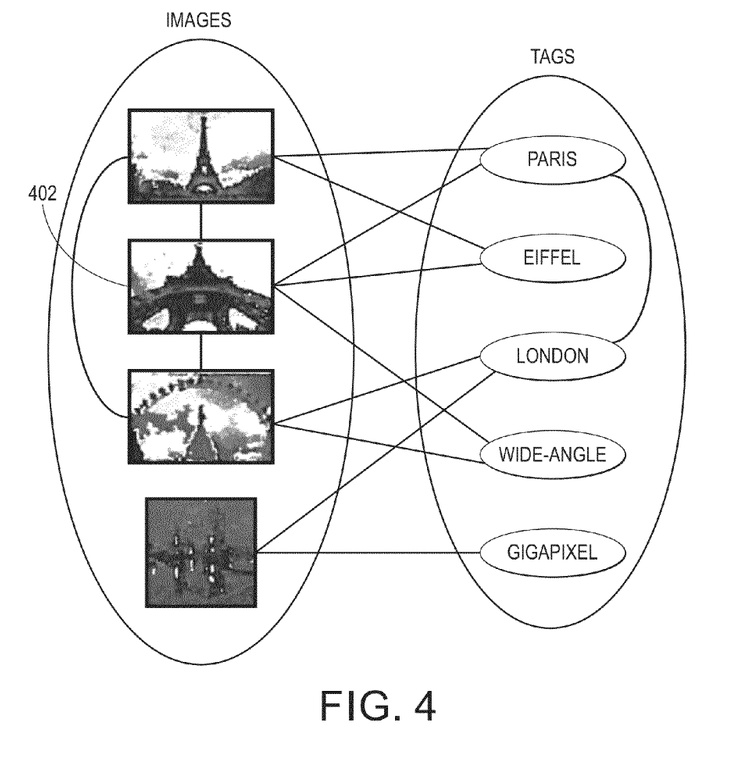

Without loss of generality, in the exemplary embodiments discussed herein, the content objects are images and tags such as in a Flickr media sharing system. Other options of content objects are web pages or scientific publications. FIG. 4 demonstrates the relational setting on a Flickr site with four images and five tags. Images are preprocessed to extract the visual content features which can then be used for the image similarity graph. Likewise, tags can be featured by the frequency of their usage by the users; these frequencies can help construct the tag correlation graph. A bi-graph shows the annotation relationship between images and tags.

There are two critical aspects of deploying the graph-based methods in the relational setting. One aspect concerns the regularization framework for the graph-based ranking, another concerns the graph construction and the weight estimation.

First, the relational ranking framework can be extended based on the Laplacian regularization to the totally symmetric case where the affinity graphs are generated for both objects and tags.

Second, to construct the affinity image graph, a method is adopted of linear neighborhood propagation (LNP) which outperforms the usual pairwise distance based on a Gaussian function. The convex $l_1$-norm minimization is used on neighbor image features to estimate edge weights in the graph. The same method is applied for the tag graph, using the user tag frequencies as features.

While affinity graphs for images and tags are built from features only, the bi-graph can be the full set of (image, tag) pairs. Experiments show however that using the binary bi-graph is not optimal. Due to open free text nature of social tagging, certain (image, tag) pairs behave like noise and even relevant tags may show different degrees of relevance. For example, the second image 402 in FIG. 4 has three tags; two of them, "Eiffel" and "Paris" fit better a prior consistency assumption than the third tag "Wide-angle". Therefore the graph regularization is likely to benefit from down-weighting the edge weight to "Wide-angle". The subject embodiments comprise a method for the weight estimation in bi-graphs. The LNP is extended from being originally designed to one type objects, to the relational setting.

Selected aspects of the present embodiments can be summarized as follows:
1) The Laplacian regularization method is developed on the relational multi-type graphs to maximally benefit from the label propagation framework. The framework is symmetrically designed over image and tag affinity graphs.
2) Image visual features are used to construct the weighted image graph. A sparse graph construction is used through the convex $l_1$-norm minimization problems in graph nodes.
3) The tag graph is introduced to represent the tag correlation as certain tag pairs have more chances to be jointly used. Tags are featured by their usage by users. These features guide the linear neighborhood propagation method in the tag graph construction.
4) LNP framework has been used for uni-type data only. To estimate the link weights in multi-type relations, a method is used that extends the LNP to bi-partitive graphs. The weights are inferred from a joint $l_1$-norm optimization run for both data types.

In total, the algorithmic aspect of the present embodiments naturally addresses the tag recommendation problem by leveraging the underlying structure of images, tag correlation and the annotation relationships between images and tags collectively contributed by users.

By way of example, only images are shown as content objects and tag recommendation like in Flickr media sharing system. Other options of content objects are web pages, scientific publications or multimedia. The present embodiments encompass that any object can be described by a set of features that characterize its content. Images are described by visual features; documents are represented by its content, etc.

Continuing with the image examples, the embodiments comprise a method including first constructing a sparse affinity graph on the images. The Euclidean distance between images is avoided as being sensible to feature noise. A sparse neighborhood linearization technique is deployed on image features to infer edge weights in the graph. Second, a similar weighted affinity graph is constructed on pre-determined tags. Finally, a bi-partitive graph from the annotation relationships is used between images and tags. Upon a user request for tagging, both the image and the user tag preferences are treated as query inputs. The tags are then ranked by the proposed graph-based ranking algorithm which considers both relevance to the image and tag preference of the user. Finally, the top ranked tags are represented to the user for selection.

Several beneficial aspects result from the proposed methods:
1) The relational multi-type graphs are generated by integrating the annotation relationships between images and tags.
2) The image features are used to generate the affinity graph. Instead of the Euclidean distance sensible to feature noise, a sparse graph construction through the $l_1$-norm minimization is used.
3) Tags have been often considered as independent. In reality, tags are correlated as certain tags have more chances to be jointly used. The sparse graph construction based on $l_1$-norm linearization is also used to build the tag affinity graph.
4) A Laplacian regularization framework is deployed on the relational multi-type graphs, over image and tag affinity graphs, to maximally benefit from the label propagation framework.

In total, the present embodiments naturally address the tag recommendation problem by leveraging the underlying structure of images, tag correlation and the annotation relationships between images and tags collectively contributed by users.

Figure 1:
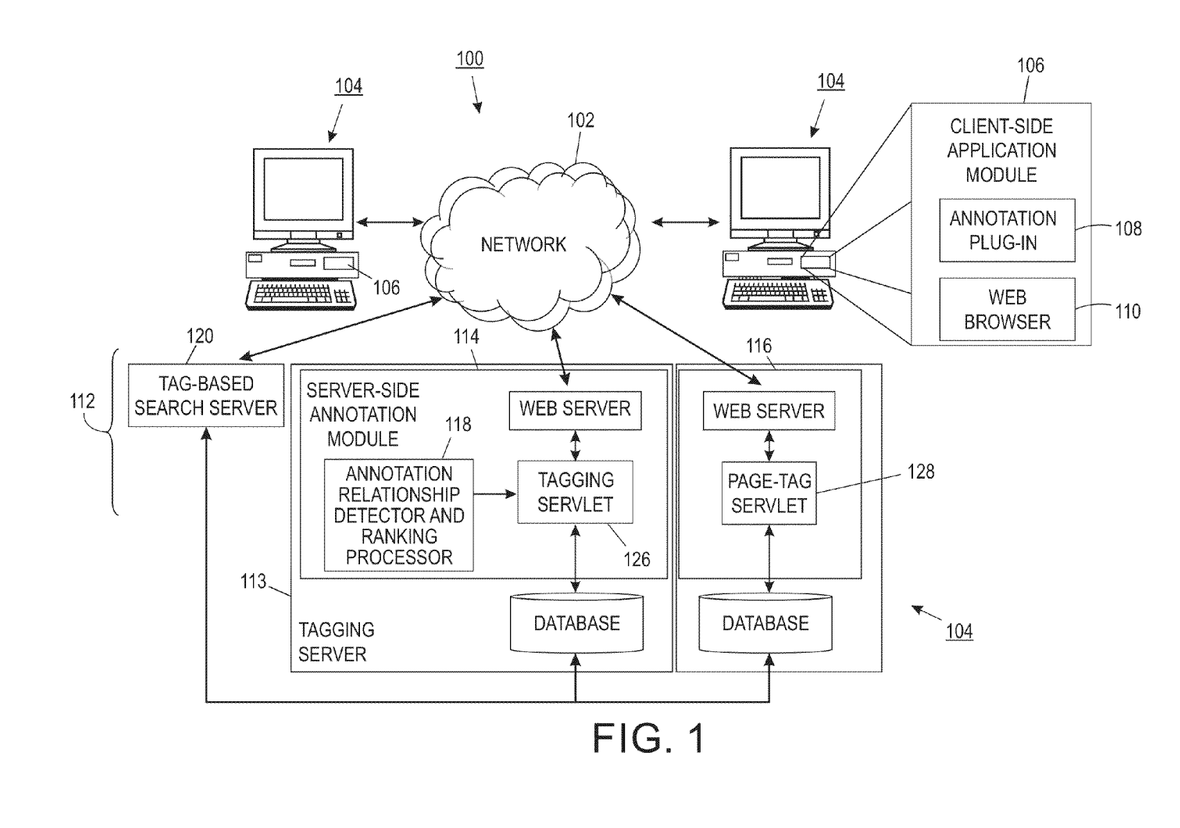
FIG. 1 is an illustration of an operating environment between servers and clients implementing a document tagging process.

FIG. 1 illustrates an example operating environment 100 for performing the embodiments disclosed herein. In the example operating environment, general purpose computers 104, which may communicate together over a network 102 such as the Internet, are programmed to perform either client-side or server-side operations. The client-side operations are performed by general purpose computers 104 loaded with client-side application modules 106, which includes annotation plug-ins 108 and web browsers 110 (such as Internet Explorer®, Firefox®, etc.). The server-side operations are performed by general purpose computers loaded with one or more server-side application modules 112, which include either one or a combination of one or more of annotation module 114, page-tagging module 116, and tag-based search server 120. More particularly, tagging server 113 includes an annotation relationship detector and ranking processor 118 in the annotation module 114 that implements the subject processes of the disclosed embodiments. A content object retrieved through search server 120, can have a tag recommendation made for it by processor 118 and tagging servlet 126, and then actively annotated to the object by page-tag servlet 128.

Two scenarios for a tag recommendation engine are as follows:

Tag bootstrap: given an image I, suggest the most likely tags to annotate I.

Tag extension: given an image I annotated with tags $t_1, t_2, \ldots$, suggest the most likely tags to additionally annotate the image I;

Several extensions are possible for the basic scenarios above. First, they can be extended to the case with not one but a set of images $I_1, I_2, \ldots$. Second, the images in the set can be owned not by one but by different users. In all cases, the system should take the available information into account and recommend the most likely tags for the entire set, either in the bootstrap or extension mode.

Linear Neighborhood Propagation

Traditional graph-based learning algorithms construct the graphs according to the visual distance, thus are very sensitive to the noise in visual features. One dimension of noisy feature may affect the graph structure significantly. Moreover, constructing the graph only based on the visual distance will bring in semantically-unrelated links between samples due to the semantic gap. An alternative way to construct a graph is to reconstruct each image by the other images as in locally linear embedding and linear neighborhood propagation. However, they still cannot handle the semantically-unrelated links.

It has been demonstrated that the $l_1$-norm based linear reconstruction can naturally lead to a sparse representation for the images. The sparse reconstruction is robust to the noise in features, and shows to enforce the images selected to reconstruct the test image as semantically-related to the test image. The graph can be constructed by datum-wise sparse reconstructions of samples via $l_1$-norm minimization. The graph constructed by datum-wise sparse reconstruction of samples can remove considerable semantically unrelated links between those semantically unrelated samples to avoid incorrect information propagation.

Sparse Graph Construction

The pursuit of the sparsest solution for a sample reconstruction over an overcomplete dictionary is an NP-hard problem in general. However, if the solution is sparse enough, the sparse representation can be recovered by convex $l_1$-norm minimization. Suppose one has an under-determined system of linear equations: $x=Dw$, where $x \in R^d$ is the feature vector of the object (image) to be reconstructed, $w \in R^n$ is the vector of the unknown reconstruction coefficients, and $D \in R^{d \times n} (d<n)$ is a matrix formed by the feature vectors of the other objects in the dataset. The sparse solution for w can be obtained by solving the following convex optimization problem:

$$\min_w \|w\|_1, \text{subject to } \|x-Dw\|_2. \quad (1)$$

This optimization problem is convex and can be transformed into a general linear programming problem. There exists a globally optimal solution, and the optimization can be solved efficiently using available $l_1$-norm optimization toolboxes like l1-MAGIC.

Let $X=x_1, \ldots, x_n$ be the set of feature vectors for n objects in the dataset, where $x_i \in R^d$, d<n, represents the i-th object in the dataset, and $G=\{X, W=(w_{ij})\}$ be the sparse graph with graph vertices being the objects in X and matrix W giving the edge weights.

The construction of the sparse affinity graph can be summarized as follows:

1. For each object $x_i$, randomly sample k>d objects from X to form the set $N_i = \{x_{ip}\}$, p=1, ..., k.
2. Form the matrix $B_i$ with feature vectors in the set $N_i$, $B_i = [x_{i1}, \ldots, x_{ik}] \in R^{d \times k}$. Then the vector $w_i$ of the reconstruction coefficients for $x_i$ can be obtained by solving the following $l_1$-norm minimization problem:

$$\min_{w_i} \|w_i\|_1, \text{subject to } \|x_i - B_i w_i\|_2 < \epsilon, \quad (2)$$

where $w_i \in R^d$ and parameter $\epsilon$ is small and proportional to an estimate of the standard deviation of feature noise. If $\epsilon$ is 0, the problem is known as the basis pursuit [2].

3. Set the edge weight $w_{ij}$ from the object $x_j$ to the object $x_i$ as:

$$w_{ij} = \begin{cases} w_i(j), & \text{if } x_j \in N_i \text{ and } w_i(j) \geq \theta, \\ 0, & \text{otherwise.} \end{cases} \quad (3)$$

where $i,j \in \{1, 2, \ldots, n\}$ and $w_i(j)$ denotes the j-th element of vector $w_i$.

Ranking on Relational Multi-Type Graphs

Two sets of objects, image set I and tag set T are handled. Let $n_I$ and $n_T$ denote the size of I and T, respectively. An affinity graph $G_I$ is assumed to reflect the similarity between images in I. There is also an affinity graph $G_T$ for T, and a bipartite graph $G_{IT}$ describing annotation relationships between images and tags.

The problem is defined as follows. Given a query q, how to rank images in I and tags in T according to their relevance to query q. Let $W^I$ be a $n_I \times n_I$ affinity matrix corresponding to $G_I$, $W^T$ be a $n_T \times n_T$ affinity matrix corresponding to $G_T$ and $W^{IT}$ be a $n_I \times n_T$ affinity matrix corresponding to $G_{I,T}$. Matrices $W^I$ and $W^T$ are generally asymmetric. Let $y_I = [y_{I1}, \ldots, y_{In_I}]^T$ and $y_T = [y_{T1}, \ldots, y_{Tn_T}]^T$ denote the ranking vectors for images and tags, respectively. The query vector q is composed of two parts, image query and tag query, $q=[q_I, q_T]$. The image query vector is $q_I = [y_{I1}, \ldots, y_{In_I}]^T$ where $y_{Ii}=1$ if image $i \in I$ is a query. Similarly, the tag query vector is $q_T = [y_{T1}, \ldots, y_{Tn_T}]^T$ where $y_{Tt}=1$ if tag $t \in T$ is a query.

The goal is to infer the ranking vectors $y_I$ and $y_T$ from $W^I$, $W^T$, $W^{IT}$, $q_I$ and $q_T$. To define the querying in a general form, where given a query $q=[q^I, q^T]$, the images are ranked in I and tags in T with respect to q. Each scenario described herein represents a particular instantiation of query q and interpretation of the ranking vectors $y_1$ and $y_T$.

Laplacian Multi-Type Regularization

Four diagonal matrices $D^I, D^T, D^{II}$ and $D^{TT}$ are defined. The size of $D^I$ and $D^{II}$ is $n_I \times n_I$. $D^T$ and $D^{TT}$ have size $n_T \times n_T$. The diagonal (i,i)-th elements of $D^I$ and $D^T$ equal to the sum of the i-th row of $W^I$ and $W^T$. In $D^{II}$ and $D^{TT}$, the (i,i)-th elements equal to the sum of the i-th row of $W^{IT}$ and the sum of the i-th column of WIT, respectively.

Ranking vectors $y_I$ and $y_T$ should be as consistent as possible with the given information, that is, matrices $W^I, W^T, W^{IT}$ and query $q=[q_I, q_T]$. The cost function is defined as composed of the following terms:

1. The smoothness constraint on images requires a good ranking to assign similar ranking scores to similar images:

$$C_1 = \sum_{i,j=1}^{n_I} W_{ij}^I \left( \frac{y_{Ii}}{\sqrt{D_{ii}^I}} - \frac{y_{Ij}}{\sqrt{D_{jj}^I}} \right)^2. \tag{4}$$

2. The similar smoothness constraint on tags, requires a good ranking to assign similar ranking scores to similar tags:

$$C_2 = \sum_{i,j=1}^{n_T} W_{ij}^T \left( \frac{y_{Ti}}{\sqrt{D_{ii}^T}} - \frac{y_{Tj}}{\sqrt{D_{jj}^T}} \right)^2. \tag{5}$$

3. The third term means if a tag is strongly associated with an image, then they should have similar ranking scores:

$$C_3 = \sum_{i=1}^{n_I} \sum_{t=1}^{n_T} W_{it}^{IT} \left( \frac{y_{Ii}}{\sqrt{D_{ii}^{II}}} - \frac{y_{Tt}}{\sqrt{D_{tt}^{TT}}} \right)^2. \tag{6}$$

4. The fourth term measures the difference between the obtained image ranking scores and the image query:

$$C_4 = \sum_{i=1}^{n_I} (y_{Ii} - q_{Ii})^2. \tag{7}$$

5. The fifth term measures the similar difference between the obtained tag ranking scores and the tag query:

$$C_5 = \sum_{i=1}^{n_T} (y_{Ti} - q_{Ti})^2. \tag{8}$$

These five terms compose the cost function associated with $y^I$ and $y^T$, as follows:

$$Q(y_I, y_T) = \sum_{1}^{5} \alpha_i C_i, \tag{9}$$

where the contribution of terms of the cost function is controlled by the regularization parameters $\alpha_i$, $i=1, \ldots, 5$, where $0<\alpha_i<1$ and $\Sigma_i \alpha_i = 1$.

Matrices $S_I = (D^I)^{-1} W^I$, $S_T = (D^T)^{-1} W^T$ and $S_{IT} = (D^{II})^{-1/2} W^{IT} (D^{TT})^{-1/2}$) are defined. With simple algebraic formulations, the first and second terms can be rewritten as follows:

$$C_1 = Y_I^T (I - S_I) y_I \tag{10}$$

$$C_2 = y_T^T (I - S_T) y_T \tag{11}$$

Similarly, the third term can be computed as follows:

$$C_3 = Y_I^T y_I + y_T^T y_T - 2 y_I^T S_{IT} y_T. \tag{12}$$

Then equation (9) can be rewritten in the matrix-vector form:

$$Q(y_I, y_T) = \alpha_1 Y_I^T (I - S_I) y_I + \tag{13}$$

$$\alpha_3 y_T^T (I - S_T) y_T + \tag{14}$$

$$\alpha_3 (y_I^T + y_T^T y_T - 2 y_I^T S_{IT} y_T) + \tag{15}$$

$$\alpha_4 (y_I - q_I)^T (y_I - q_I) + \tag{16}$$

$$\alpha_5 (y_T - q_T)^T (y_T - q_T) + \tag{17}$$

Then the optimal rankings are achieved when $Q(y_I, y_T)$ is minimized:

$$[y^*_I, y^*_T] = \mathrm{argmin}_{y_I, y_T} Q(y_I, y_T). \tag{18}$$

$Q(y_I, y_T)$ is differentiated with respect to $y_I$ and $y_T$ and set to 0. We obtain the following system is obtained:

$$(\alpha' I + 2\alpha_1 S_I) y_I - \alpha_2 S_{IT} y_T - \alpha_4 q_I = 0 \tag{19}$$

$$(\alpha'' I + 2\alpha_2 S_T) y_T - \alpha_1 S_{IT}^T y_I - \alpha_5 q_T = 0. \tag{20}$$

where $\alpha' = 2\alpha_1 + \alpha_3 + \alpha_4$ and $\alpha'' = 2\alpha_2 + \alpha_3 + \alpha_5$.

Iterative Evaluation

The closed form can be achieved for the system (19)-(20), however it would require explicitly inverted matrices $S_T^{-1}$ and $S_T^{-1}$. For practical cases, the iterative form is more preferable. Equations (19)-(20) are rewritten in order to obtain an iterative algorithm. The initial values of $y_I$ and $y_T$ are set to the query vectors, $y_I(0) = q_I$ and $y_T(0) = q_T$. In the t+1-th iteration, $y_I(t)$ and $y_T(t)$ are computed in the previous iteration to compute $y_I(t+1)$ and $y_T(t+1)$:

$$y_I(t+1) = \frac{1}{\alpha'} (\alpha_3 S_{IT} y_T(t) - 2\alpha_1 S_I y_I(t) + \alpha_4 q_I) \tag{21}$$

$$y_T(t+1) = \frac{1}{\alpha''} (\alpha_3 S_{IT}^T y_I(t) - 2\alpha_2 S_T y_T(t) + \alpha_5 q_T). \tag{22}$$

One can see that $y_I(t)$ and $y_T(t)$ reinforce each other in each iteration. It can be shown that $y_I(t)$ and $y_I(t)$ converge to $y^*_I$ and $y^*_T$, respectively:

$$[y^*_I, y^*_T] = \lim_{t \to \infty} [y_I(t), y_T(t)]. \tag{23}$$

Querying Scenarios

With reference to the foregoing scenarios for tag recommendation, each scenario requires an appropriate way of generating the image and tag query vectors. For the two basic scenarios above they are the following:

Tag bootstrap: given an image I, suggest the most likely tags to annotate I.

In the image query vector $q_I$, one can 1 for image I and 0 for all others. To compose the tag query vector $q_T$, the frequencies freq(u, t) of using a tag t∈T by user u in the collection. Several possible options for generating the tag query vector are:

Binary: $q_{Tt} = 1$ if freq(u,t)>θ, where θ is a threshold value;
Linear: $q_{Tt} = \mathrm{freq}(u, t)$;
Sqrt: $q_{Tt} = \sqrt{\mathrm{freq}(u,t)}$;
Log: $q_{Tt} = \log(\mathrm{freq}(u,t)+1)$;
Exp: $q_{Tt} = e^{\mathrm{freq}(u,t)} - 1$.

Tag extension: a given image I is already annotated with tags $T_0 = \{t_1, t_2, \ldots\}$. In the tag query vector $q_T$, in addition to the user tag frequencies, all tags present in $T_0$ set to 1.

In the case of extended scenarios with a set of images, the query vectors are formed in the similar manner. The image query vector $q_I$ has 1 for all images in the set and 0 for all others. The tag query vector $q_T$ is additionally weighted by individual tag preferences of users whose images compose the set.

Figure 2:
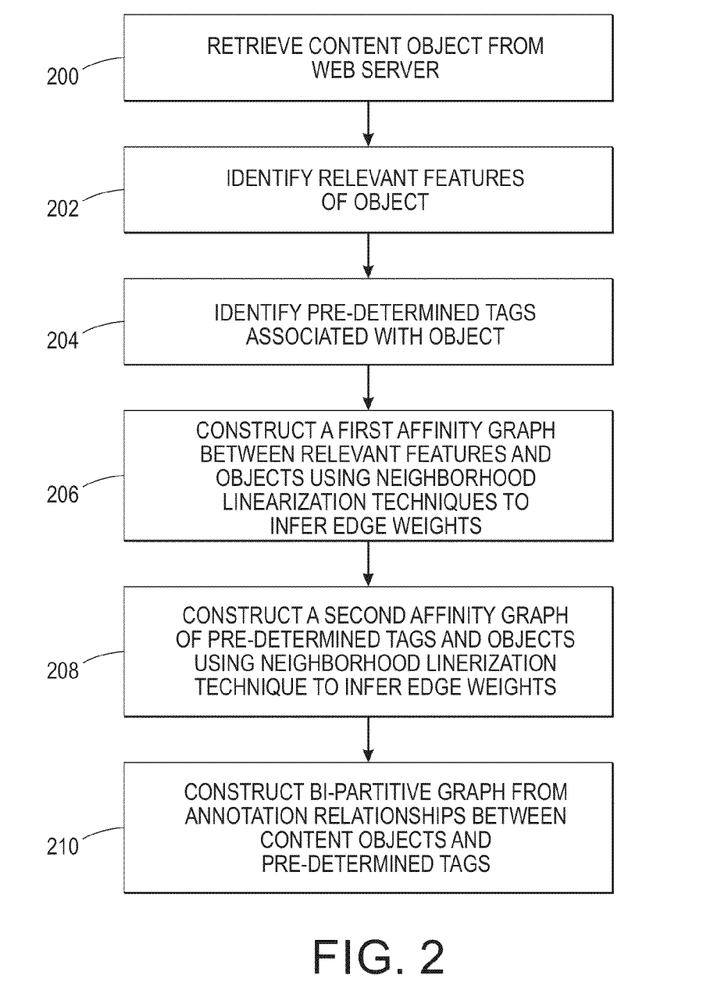
FIG. 2 is a flowchart illustrating a process for constructing affinity graphs relative to content objects predetermined tags.
Figure 3:
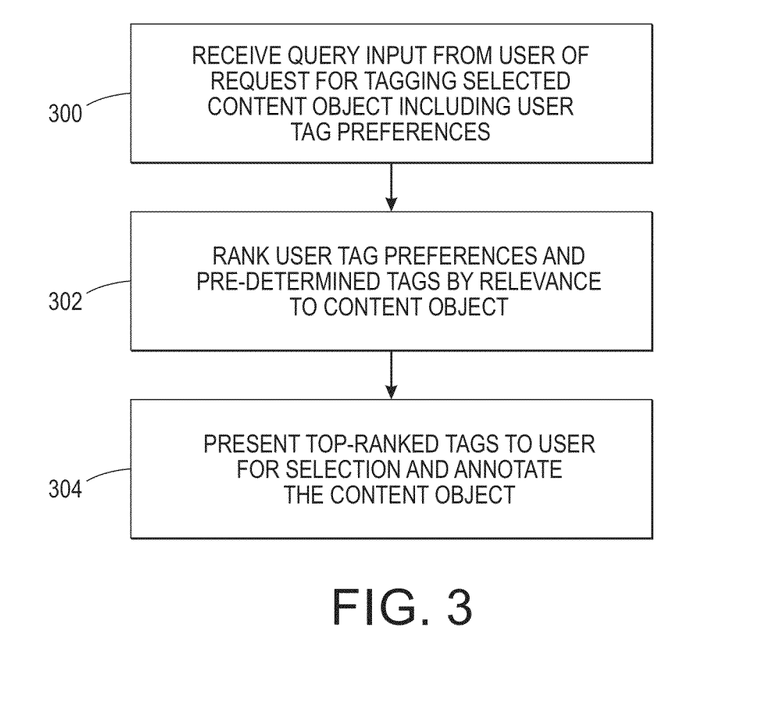
FIG. 3 is a flowchart illustrating a process for receiving a query input for an annotation tag to a particular content object; and, FIG. 4 is an illustration of a representation of a set of images in association with predetermined tags.

With particular reference to FIGS. 2 and 3, flowcharts for illustrating the processing steps implementing the aforegoing operating principles are illustrated. FIG. 2 illustrates the generation of relational multi-type graphs by integrating the annotation relationship between images and tags. FIG. 3 illustrates the steps for ranking and suggesting a particular tag to a user in response to a query for a selected object.

The generation of the relational multi-type graphs first comprises retrieving content objects from a web server. Relevant features of an object can be identified and FIG. 4 illustrates content objects comprising images and some predetermined tags relative to content features within the images. It can be seen with reference to the Figure how certain predetermined tags are identified 204 relative to the associated features of the object. For example, a wide angle photograph 402 of the Eiffel Tower has tags of "Paris", "Eiffel" and "Wide-angle". A first affinity graph is constructed 206 between the relevant features and the objects using neighborhood linearization techniques to infer edge weights. As noted above, a sparse representation noise can be recovered by convex $l_1$-norm minimization. A second affinity graph is constructed 208 of the predetermined tags and the objects also using neighborhood linearization to infer edge weights. A bi-partitive graph is constructed from the annotation relationships between the content objects and predetermined tags.

With reference to FIG. 3, a process for suggesting a tag to a user comprises 300 a query input from a user of a request for tagging a selected content object and may include a tag preference as suggested by the user. With reference to the predetermined affinity graphs, the user tag preferences are ranked 302 with reference to other predetermined tags by relevance to the content object. Top ranked tags can then be presented 304 to the user for selection and annotation with the tag of the content object.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for tagging a latent object with selected tag recommendations, including:
    receiving an input from a user for tagging the latent object wherein the input includes a user tag preference and wherein the latent object is characterized by a set of predetermined tags representative of an associated set of content features;
    generating a query using the tag preference for comparing the tag preference to the set of predetermined tags;
    determining a first annotation relationship between the features and the set of predetermined tags for the object, the relationship being defined by a graph construction representative of an affinity relationship between each predetermined tag and the object content features;
    determining a second annotation relationship representative of frequency of tagging usage of each of the set of predetermined tags;
    ranking the first and second annotation relationships based upon a weighted relevance of the predetermined tags and the user tag preference to the object content features using a neighborhood linearization technique to infer edge weights; and
    suggesting a plurality of suggested tags from the ranking whereby the suggested tags are determined as most likely for annotating the content object.

2. The method of claim 1 wherein the determining the first annotation relationship comprises constructing a sparse affinity graph representative of the affinity relationship.

3. The method of claim 1 wherein the ranking comprises computing ranking vectors for the content objects and predetermined tags, respectively, in accordance with an iterative evaluation for identifying a converging correlation between the content objects and the predetermined tags in response to the query.

4. The method of claim 1 wherein the determining the first annotation relationship comprises an integrating of the annotation relationship between the latent object, the predetermined tags, and the user tag preference.

5. The method of claim 1 wherein the defining of the graph construction comprises a use of object features and an $l_1$-norm minimization.

6. The method of claim 5 further including determining an affinity relationship between the predetermined tags using a sparse graph construction based on $l_1$-norm minimization for building a tag affinity graph.

7. The method of claim 1 wherein the ranking includes deploying a Laplacian regularization framework on the graph construction for assessing a label propagation framework.

8. The method of claim 7 wherein the graph construction comprises object and tag affinity graphs.

9. The method of claim 1 wherein the determining and ranking comprise latent objects including images or documents.

10. A tag recommendation system for annotating content objects including:
    an annotation module comprising an annotation relationship detector and ranking processor wherein each object is characterized by an associated set of content features and the processor determines a first annotation relationship between the features and predetermined tags for the object, the relationship being defined by a graph construction representative of an affinity relationship between the predetermined tags and content objects to a selected query; and,
    determining a second annotation relationship representative of frequency of tagging usaqe of each of the set of predetermined tags, wherein the processor ranks a plurality of the annotation relationships based upon a relevance of the predetermined tags to the content features in response to a user input of a user tag preference for assigning a new tag to the object, and suggesting suggested tags from the ranking as most likely for annotating the content object.

11. The system of claim 10 wherein the first annotation relationship comprises a construction of a sparse affinity graph representative of the affinity relationship.

12. The system of claim 11 wherein the graph construction comprises a use of object features and an $l_1$-norm minimization.

13. The system of claim 10 wherein the first annotation relationship comprises computing ranking vectors for the content objects and predetermined tags, respectively, in accordance with an iterative evaluation for identifying a converging correlation between the content objects and the predetermined tags in response to the selected query.

14. The system of claim 10 wherein the annotation relationship comprises an integration of the annotation relationship between the latent object and the predetermined tags.

15. The system of claim 10 wherein the first annotation relationship comprises a Laplacian regularization framework on the graph construction for assessing a label propagation framework.

16. The system of claim 15 wherein the graph construction comprises object and tag affinity graphs.

17. The system of claim 10 wherein the content objects are internet accessible.

18. The system of claim 10 wherein the content objects comprise a computer memory stored collection of content objects.

19. The method of claim 1 further including comparing the ranking of the first annotation relationship and the ranking of the second annotation relationship to the user tag preference.

20. The method of claim 10 further including comparing the ranking of the first annotation relationship and the ranking of the second annotation relationship to the user tag preference.

* * * * *